United States Patent [19]

Esposito

[11] 4,286,796
[45] Sep. 1, 1981

[54] HAND TRUCK

[76] Inventor: Patsy Esposito, 350 Clarkson Ave., Brooklyn, N.Y. 11226

[21] Appl. No.: 82,944

[22] Filed: Oct. 9, 1979

[51] Int. Cl.³ .............................................. B62B 1/02
[52] U.S. Cl. .......................... 280/47.27; 280/47.37 R
[58] Field of Search .............. 280/42.24, 47.29, 47.27, 280/47.28, 47.37 R, 47.18, 33.99 H, 640; 248/129; 211/195, 200

[56] References Cited

U.S. PATENT DOCUMENTS

| D. 246,774 | 12/1977 | Esposito | D12/34 |
|---|---|---|---|
| 1,428,180 | 9/1922 | More | 280/47.28 |
| 2,680,027 | 6/1954 | Puydt et al. | 280/47.28 |
| 3,043,603 | 7/1962 | Major, Sr. | 280/40 |
| 3,079,168 | 2/1963 | Monroe et al. | 280/47.28 |
| 3,193,123 | 7/1965 | Wouden | 280/47.27 X |
| 3,540,752 | 11/1970 | Anuskiewicz | 280/47.37 |
| 3,612,563 | 10/1971 | Kazmark, Sr. | 280/34 |
| 3,827,707 | 8/1974 | Bierman | 280/47.24 X |
| 3,947,054 | 3/1976 | Hall | 280/36 C |
| 3,948,537 | 4/1976 | Black | 280/47.28 |
| 3,998,476 | 12/1976 | Kazmark, Sr. | 280/655 |
| 4,037,858 | 7/1977 | Adams | 280/652 |
| 4,072,319 | 2/1978 | Berger | 280/47.37 R |
| 4,121,855 | 10/1979 | Mortensen | 280/47.29 X |

FOREIGN PATENT DOCUMENTS

| 1247232 | 10/1960 | France | 280/47.18 |
|---|---|---|---|
| 458208 | 8/1968 | Switzerland | 280/47.27 |
| 2019789 | 11/1979 | United Kingdom | 280/47.24 |

Primary Examiner—David M. Mitchell
Assistant Examiner—D. W. Underwood
Attorney, Agent, or Firm—Auslander, Thomas & Morrison

[57] ABSTRACT

A small collapsible hand truck has great strength for its size and includes a stable extendable platform almost as long as the body frame. The hand truck is adaptable to various shapes and weights of load.

3 Claims, 5 Drawing Figures

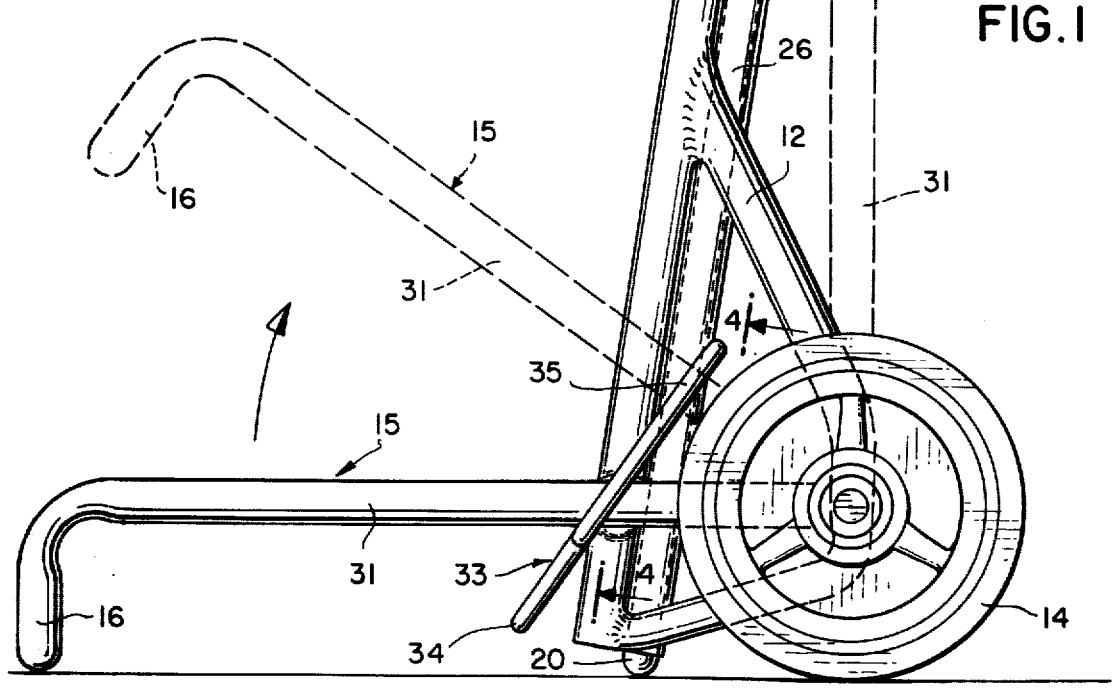

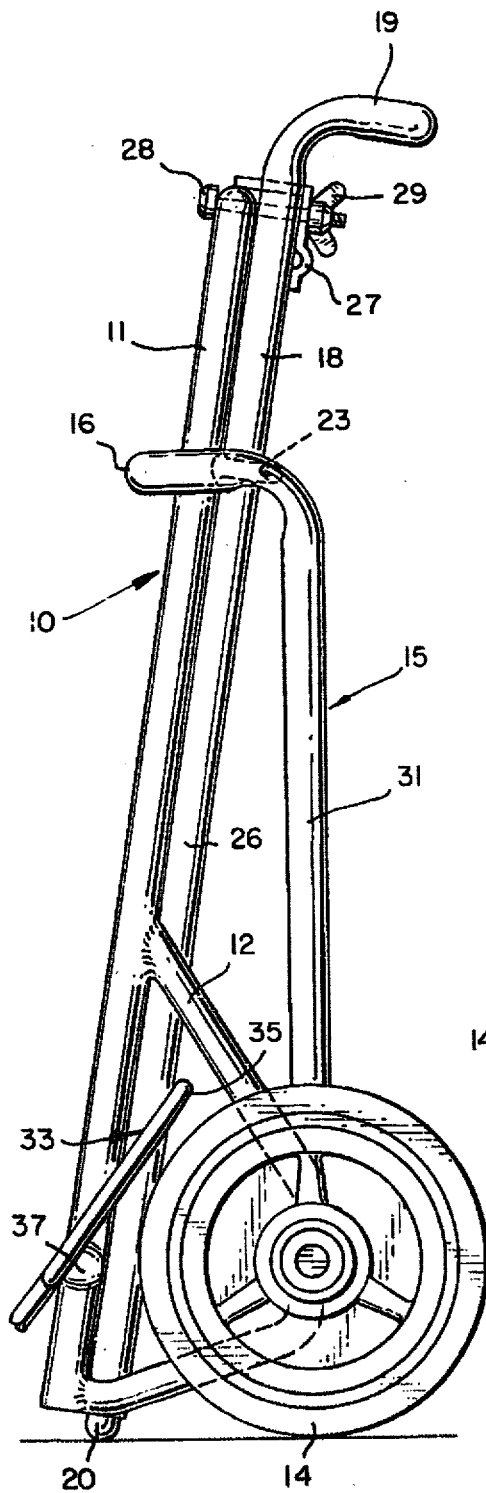
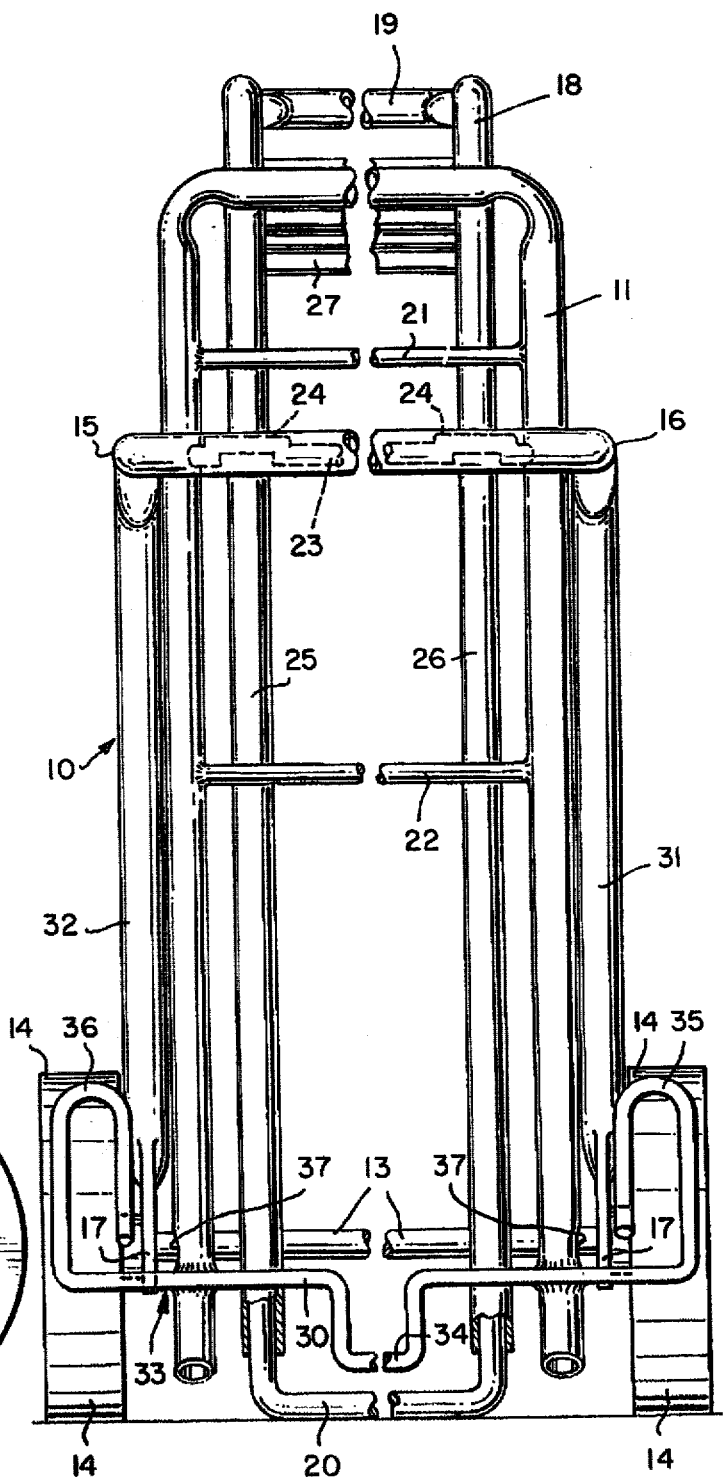

HAND TRUCK

The present invention relates to a hand truck, particularly a small collapsible hand truck with an extendable platform which may be used for handling personal luggage or heavy articles.

Hand trucks of the past have been provided for many purposes, such as the handling of heavy articles or even small, collapsible hand trucks and similar devices usable for the easy transport of luggage or other similar articles.

It has been found convenient and effective to be able to place luggage on a small, collapsible hand truck so that handling of the luggage is facilitated in bringing it to a plane or a train and departing therefrom. Oftentimes, the collapsible hand truck can be folded and tagged as luggage, once luggage has been delivered, and the hand truck shipped as part of the luggage, then retrieved at the end of the journey and used to haul away the entire luggage.

Modes for the travel handling of luggage include wheels, integral or attachable to luggage, with handles or cords, or rolling luggage, or various collapsible devices usable as small hand trucks and convenient to carry when collapsed. Typical of prior art devices serving the self-handler of luggage, are U.S. Pat. No. Des. 246,774 to the present inventor, where a small hand truck includes an extendable handle, wheels, a small flip-down extendable platform and straps to hold luggage on the hand truck. Other United States patents such as U.S. Pat. No. 4,072,319, 4,037,858, 3,998,476, 3,947,054, 3,612,563, 3,540,752 and 3,043,603, for example, show permutations and combinations of extendable handles, wheels, platforms and straps, particularly usable with luggage.

The present invention provides a collapsible hand truck which handles luggage, yet has a construction that includes the strength and adaptability to handle heavy articles or heavy luggage and does not have to be restricted to articles of luggage alone.

The present invention is distinguished from large heavy-duty hand trucks, particularly with extendable platforms such as found in U.S. Pat. No. 3,948,537, 3,079,168 and 2,680,027, which are too large and too bulky to be used as personal luggage carriers or be carried by the user, also as the user's personal luggage.

Among portable luggage carriers including platforms or extendable platforms, such as found in U.S. Pat. Nos. 4,037,858, 3,998,476, 3,947,054 and 3,043,603, strength has been sacrificed for collapsibility, or complexity has been used to achieve the totality of strength and collapsibility.

For instance, the extendable platform as disclosed in U.S. Pat. No. 3,998,476, requires, arms, plates, hinges and braces to accommodate a relatively short platform that may be retractable. The extendable platform in U.S. Pat. No. 3,947,054 is short, with reinforcement and is supported only by a strap. The platform in U.S. Pat. No. 4,037,858 is small and is supported by an elastic strap. The carrier is not well adapted to carry more than one piece of luggage. The small platform in U.S. Pat. No. 3,043,603 has little support other than the small flanges and pins to support any weight on the platform. The small extending platform in U.S. Pat. No. 4,072,319 obtains its strength from elastic cables. The small extending platform in U.S. Pat. No. Des. 246,774 rests on a shorter extended platform.

The platform of the present invention is generally about the size of the body frame of the hand truck of the present invention. In its preferred embodiment, the hand truck of the present invention and its platform are formed of steel tubing. The tubing provides great structural strength without undue weight. The platform further, when extended rigidly, holds itself in position and with its down-turned lip, supports the entire hand truck from unbalance. The extent of the platform enables the hand truck to accept one article, or more than one article, either vertically stacked on the platform, or articles piled on top of each other from the platform. The extended platform is strong, collapsible, with sturdy, simple parts, which enable the hand truck of the present invention to be used as a small luggage carrier, which can be collapsed and shipped as luggage after use, or the hand truck may be used to carry articles of varying bulk, even weighing up to several hundred pounds.

The hand truck of the present invention may be usable with straps to secure a load, although contrary to many of the hand trucks of the prior art, the straps are not needed to support the load on the platform, they are optional. The platform is also constructed to retain itself closed when the hand truck is collapsed, without the need for straps or complex mechanisms.

According to the present invention, a collapsible hand truck of strong construction is provided with a relatively long extendable platform which maintains itself closed when the hand truck is collapsed and which supports the hand truck when the platform is extended. The hand truck also has a sturdy and simple construction.

The hand truck preferably includes a sturdy extendable handle.

Although such novel feature or features believed to be characteristic of the invention are pointed out in the claims, the invention and the manner in which it may be carried out, may be further understood by reference to the description following and the accompanying drawings.

FIG. 1 is a side elevation of the hand truck of the present invention with the platform extended.

FIG. 2 is a side elevation of the hand truck of FIG. 1 with the platform closed.

FIG. 3 is a broken elevation of FIG. 2.

FIG. 4 is a detail of FIG. 1 at lines 4—4.

FIG. 4a is a detail of FIG. 4 at lines 4a—4a.

Referring now to the figures in greater detail, where like reference numbers denote like parts in the various figures.

The hand truck 10 comprises a basic U-shaped bent tubular frame 11. Axle supports 12 extend behind the flat of the U-shaped frame 11 and support an axle 13 on which are mounted wheels 14. An extendable platform 15 is another bent tubular frame having a bent lip 16. The free ends 17 of the platform 15 tubing are flattened with openings (not shown), through which an axle 13 is threaded. The platform is positioned between the wheels 14 and the axle support 12.

The platform 15 comprises a pair of arms 31, 32, with a U-shaped lip 16 extending from the arms 31, 32, and in the form of an "L." The mouth of the U-shaped lip 16 is dimensioned to be slightly narrower than the width of the frame 11. Thus, when the platform 15 is in retracted position, it will cradle the frame 11 and preferably not fully release from that position. The normal resilience of the frame 11 tubing allows the platform 15 to slide past the frame for extending or retracting. There is thus, preferably resilience in both the platform 15 and the frame 11. In extended position, the platform 15 is rotated downward and comes to rest on a crossbar 33.

The crossbar 33 also acts as a crossbrace for the frame 11, and further preferably includes a loop 34 which may be used to engage hooks on elastic straps (not shown) for holding articles on the hand truck 10.

The crossbar 33 also includes spring loops 35, 36 which squeeze the arms 31, 32 of the platform 15 against the frame 11, and engage the arms 31, 32 in the notches 37 on the frame 11, holding the platform 15 firmly in position when fully extended, as can be seen in FIG. 4a.

An extendable handle 18 is a bent tubular frame with a bent lip 19, preferably with a bottom closure 20. The handle 18 rests between frame crossbraces 21, 22, which are substantially on a plane with the frame 11 and an extended loop brace 23, which includes two loops 24, which engage the arms 25, 26 of handle 18. The handle 18 is controlled by a bracket 27, held on a screw 28 which passes through the frame 11 and is tightened by a wing nut 29.

The handle 18 is extended by loosening the wing nut 29, grasping the lip 19 of the handle 18 and raising it. The closure 20, which is firmly engaged in the arms 25, 26 of the handle 18, acts as a stop and engages the inset portion of the extended loop brace 23. The extended loop brace 23 and crossbraces 21, 22 keep the handle 18 guided in a track formed by the loops 24. The handle 18 is held in extended position by tightening the wing nut 29. The ends of the bracket 27 tightly grasp the arms 25, 26 of the handle 18 and hold the handle with the closure 20 stopped on the inset extended loop brace 23 and squeezed between the bracket 27 and the frame 11.

The handle 18 may be retained in the retracted position by the wing nut 29, holding the handle 18 in its unextended position, tightened against the brace 27. In the unextended position of the hand truck 10, it is preferable that the U-shaped lip 16 cradles the frame 11. In this position, the hand truck 10 takes a minimum of space and may even stand erect, balanced on the wheels 14 and the closure 20, in some instances.

In use, the platform 15 is rotated downward and engaged in the notches 37 and the handle 18 extended and tightened in position. The hand truck 10, when opened, stably supports itself on the wheels 14 and the lip 16, while the hand truck 10 is being loaded. The load may be conventionally secured by the use of straps, if necessary or desired.

The platform 15 has little bulk, but great strength, because of its tubular construction. The platform 15 may be almost as big as the frame 11, which gives a large expanse while extended, yet the platform 15 adds little weight or bulk to the hand truck 10. The hand truck 10 of the present invention is unusually adapted to take a wide assortment of loads, both as to bulk and as to weight, and yet collapse to a relatively small article for stowage. Part of the strength of the platform 15 is derived from the fact that the platform 15 is attached to the axle 13 and rotates from behind the flat of the frame 11 and is supported on the crossbar 33 at the frame 11. Thus, the platform 15 is sturdy when extended, and does not need auxiliary support such as braces or straps in order for the platform 15 to support any load or itself.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A collapsible hand truck comprising:
   a U-shaped tubular frame having first and second legs;
   a handle attached to said frame;
   first and second axle supports having aligned holes therein affixed to and extending behind said first and second legs;
   an axle extending through said aligned holes;
   first and second wheels on said axle, said first and second wheels being disposed outside said first and second legs respectively;
   a tubular platform having first and second arms joined together by a lip which is bent at right angles to said first and second arms and includes a cross piece extending therebetween, said first arm being hingeably attached to said axle between said first wheel and said first leg, said second arm being hingeably attached to said axle between said second wheel and said second leg;
   a crossbar extending between said first and second legs and having support ends extending therebeyond;
   said tubular platform being hingeable on said axle between first and second positions;
   said first position being substantially parallel to said frame;
   said second position being substantially at right angles to said frame;
   said cross piece being restable on a horizontal surface in said second position and is effective to hold said tubular platform substantially horizontal;
   said first and second arms being spaced apart to provide an interference fit between said first and second arms and said first and second legs in said first position whereby said tubular platform is held in said first position until forcibly moved from said first position; and
   said support ends being positioned below and contiguous to said first and second arms when said platform is in its second position and effective to support said platform and any load thereon when said frame is tilted rearward on said wheels to raise said cross piece from said horizontal surface.

2. A collapsible hand truck according to claim 1 further comprising at least one notch in a surface of one of said first and second legs, said notch being positioned to receive a surface of one of said first and second arms when said tubular platform is in its second position and resilient means for urging of said first and second arms against said one of said first and second legs when said tubular platform is in its second position whereby said at least one notch acts as a detent to hold said tubular platform in said second position until forcibly moved therefrom.

3. A collapsible hand truck comprising:
   a U-shaped tubular frame having first and second legs;
   first and second axle supports affixed behind said first and second legs and having first and second aligned holes therein;

an axle passing through said first and second aligned holes;

first and second wheels on opposed ends of said axle outside said first and second legs;

a tubular platform having first and second arms and a cross piece joining said first and second arms;

third and fourth aligned holes in said first and second arms;

said third aligned hole engaging said axle between said first axle support and said first wheel;

said fourth aligned hole engaging said axle between said second axle support and said second wheel;

said first and second arms being bent at right angles at corresponding positions spaced from said cross piece to form a lip;

said platform being hingeable on said axle between a first position, wherein said first and second arms are substantially parallel to said first and second legs, to a second position wherein said first and second arms are substantially at right angles to said first and second legs;

said lip being restable upon a horizontal surface to support a load on said platform when said platform is in its second position;

at least portions of said first and second arms adjacent said lip being spaced apart for an interference fit against outsides of said first and second legs respectively as said platform is moved into its first position whereby said first and second arms are held in said first position by said interference fit until forcibly moved from said first position;

a notch in at least one of said first arm and said first leg positioned to be engaged by the other thereof when said platform is in said second position;

means effective in said second position for resiliently urging said first arm against said first leg whereby said notch functions as a detent to maintain said platform in its second position until forcibly moved therefrom; and a crossbar across said first and second legs and having ends extending beyond said first and second legs to support said first and second arms when said platform is in its second position and said frame is tilted rearward on said first and second wheels.

* * * * *